(12) United States Patent
Babtkis et al.

(10) Patent No.: US 12,067,103 B2
(45) Date of Patent: Aug. 20, 2024

(54) IFRAME INJECTION IN MOBILE WEB BROWSER APPLICATIONS FOR WEB BROWSER EXTENSION OPT-IN

(71) Applicant: PAYPAL, INC., San Jose, CA (US)

(72) Inventors: Zachary C Babtkis, Los Angeles, CA (US); Anthony Le, Irvine, CA (US); Pavel Villarreal, Los Angeles, CA (US)

(73) Assignee: PAYPAL, INC., San Jose, CA (US)

( * ) Notice: Subject to any disclaimer, the term of this patent is extended or adjusted under 35 U.S.C. 154(b) by 299 days.

(21) Appl. No.: 17/475,160

(22) Filed: Sep. 14, 2021

(65) Prior Publication Data
US 2023/0081429 A1    Mar. 16, 2023

(51) Int. Cl.
*G06F 21/44* (2013.01)
*G06F 9/445* (2018.01)

(52) U.S. Cl.
CPC .......... *G06F 21/44* (2013.01); *G06F 9/44526* (2013.01)

(58) Field of Classification Search
CPC .............................. G06F 21/44; G06F 9/44526
See application file for complete search history.

(56) References Cited

U.S. PATENT DOCUMENTS

| | | | | |
|---|---|---|---|---|
| 8,799,988 B2* | 8/2014 | Conlan | ................. | G06F 21/606 726/1 |
| 9,571,500 B1* | 2/2017 | Chachar | .................... | G06F 3/14 |
| 9,619,113 B2* | 4/2017 | Mark | .................. | G06F 3/04817 |
| 9,635,041 B1* | 4/2017 | Warman | .................. | G06F 21/55 |
| 9,985,973 B2* | 5/2018 | Chachar | .................. | H04L 63/10 |
| 10,437,418 B2* | 10/2019 | Mark | .................... | G06F 3/0482 |
| 10,845,950 B2* | 11/2020 | Won | ........................ | G06F 3/167 |
| 11,586,726 B2* | 2/2023 | Wang | ...................... | G06F 21/52 |
| 11,610,050 B2* | 3/2023 | Nahum | .................. | G06F 9/453 |
| 2015/0205489 A1* | 7/2015 | Murphy | ................ | H04L 51/212 715/764 |
| 2019/0158666 A1* | 5/2019 | St-Cyr | .................... | G06Q 30/01 |
| 2021/0224348 A1* | 7/2021 | Nguyen | ................... | G06F 21/41 |
| 2021/0326430 A1* | 10/2021 | Coimbra | ............. | G06F 16/9535 |

\* cited by examiner

*Primary Examiner* — Yonas A Bayou
(74) *Attorney, Agent, or Firm* — Haynes and Boone, LLP

(57) ABSTRACT

There are provided systems and methods for iframe injection in mobile web browser applications for web browser extension opt-in. A service provider may provide a mobile application web browser extension, which may operate in conjunction with a mobile application web browser. The extension may interface with the web browser in order to determine data for browsed websites and user interactions and provide offers and savings to users during electronic transaction processing. In order to use the extension with the web browser, an opt-in preference and permission may be required. To provide this opt-in, the extension may cause the web browser to navigate to and load a webpage of the service provider. The extension may then inject an iframe that calls another domain, and a script of the extension executes in the iframe. The script may then infer that a permission has been granted.

20 Claims, 6 Drawing Sheets

IFRAME INJECTION IN MOBILE WEB BROWSER APPLICATIONS FOR WEB BROWSER EXTENSION OPT-IN

TECHNICAL FIELD

The present application generally relates to mobile application extensions and more particularly to providing operations to enable mobile application opt-ins for inter-application operations.

BACKGROUND

An online service may provide services to users that may be associated with online shopping and transaction processing. These services may include those associated with finding and providing discounts and other cost savings to be applied to transactions when generated on merchant websites. This may be performed through a web browser extension that monitors, scrapes, and/or extracts website data for merchant websites when a user is browsing the website and/or generating a transaction on the merchant website. For example, the web browser extension may monitor websites and data on websites, such as items added to a digital shopping cart and a total may be calculated based on items, shipping, tax, etc. However, these extensions are required to be compatible with one or more corresponding web browser applications and an opt-in by a user may be required to allow for interoperability and exchange of data. With mobile devices, applications, and application extensions, the opt-in may be elected for an amount of time and/or specific websites or may be generally elected for all websites and preferences or opt-outs may be changed. Thus, it is desirable for online transaction processors to provide options for application extension opt-in and interoperability with web browser applications.

Figure 1:
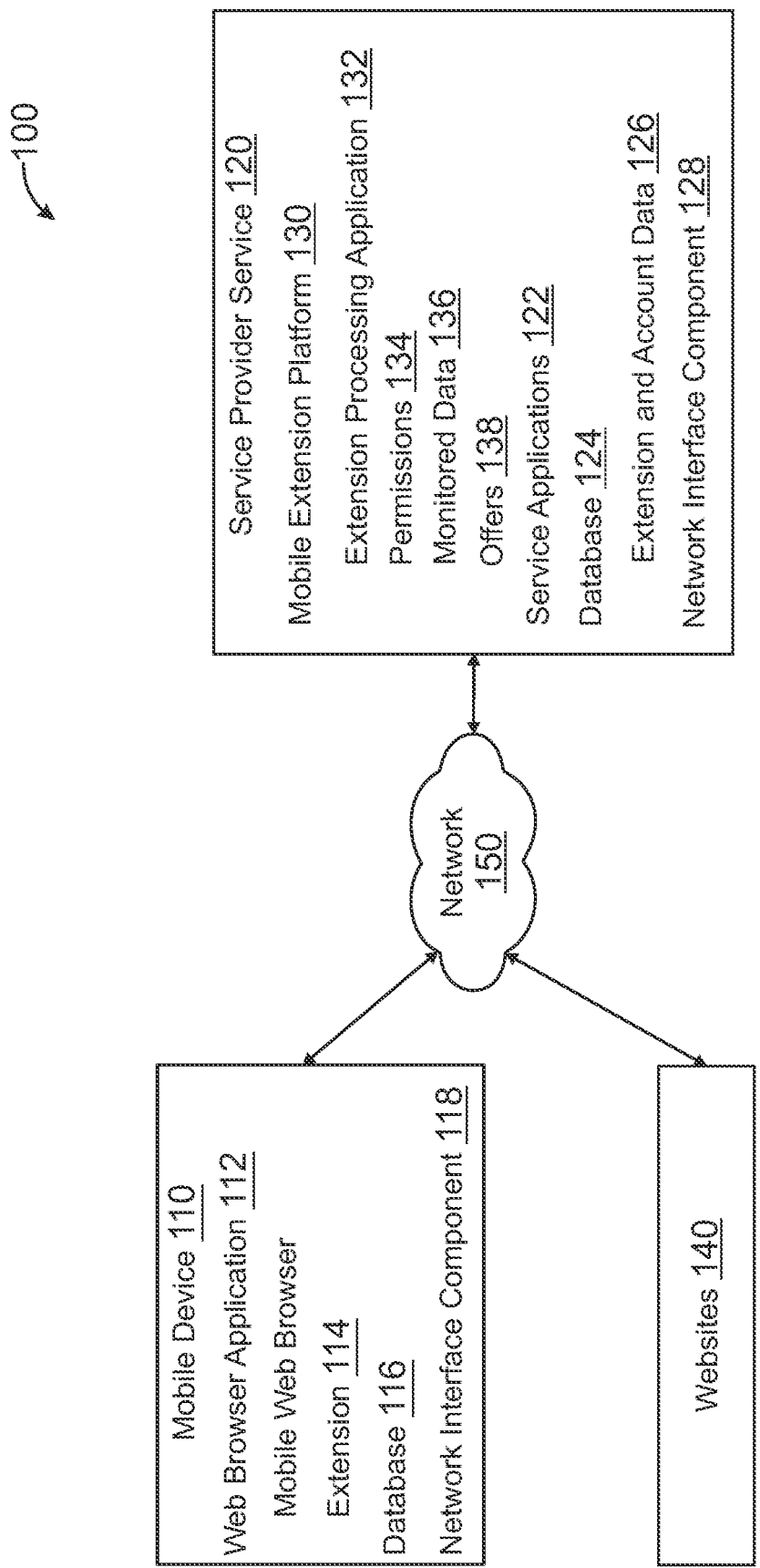
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilizing iframe injection in mobile web browser applications for web browser extension opt-in. Systems suitable for practicing methods of the present disclosure are also provided.

An online service provider may provide discount and saving services to users through a corresponding web browser extension, including those for discounts, benefits, loyalty, and other cost savings when checking out and paying for transactions electronically on the merchant websites. In this regard, the service provider may provide a web browser tool, add-on, extension, or the like, as well as a resident dedicated application (e.g., mobile application), that may monitor webpage elements on webpages of a merchant website for a merchant, such as one provided by HONEY®. The operations of the web browser extension and/or application may monitor for when items are browsed, a transaction is generated and/or items are added to a digital shopping cart, and/or when a checkout total for a transaction is available via one or more checkout webpages of the merchant website. In order to process these transactions, a user may utilize a payment card, account, and/or digital wallet to process payments through an electronic card or transaction network associated with an online transaction processor. A digital account of the user with the online transaction processor (e.g., PAYPAL®, VENMO®, etc.) may provide electronic transaction processing services to users on one or more merchant websites.

However, in order to monitor websites and user interactions with websites, to scrape and/or extract data, and to present discounts and other savings to users in a web browser application, the service provider and extension may be required to obtain an opt-in and track permissions granted by the user to the service provider and extension. This may be done on a mobile device by a user granting permissions within the mobile application and/or extension for the service provider, which allows the extension to interface with and exchange data with a mobile web browser application and/or websites navigated to and browsed using the mobile web browser application. For example, the extension may display discounts and savings for a website based on the website's data as an overlay on a portion of a webpage, in a portion of a user interface for the web browser application, and/or in a window on or in proximity to the webpage. In further embodiments, the extension may also interact with and exchange data with the website, such as by inserting and/or applying discounts, coupons, rebate requests, and other savings in one or more webpages and/or webpage elements (e.g., a field or menu to enter a code or the like for a discount). In order to provide this opt-in and permission on certain mobile devices, operating systems, and web browsers, such as on an APPLE IPHONE®, in iOS, and/or using a mobile SAFARI® web browser, the application extension may utilize a website and an injected iframe for the service provider. The iframe may allow a script for the extension to execute a call and/or navigation to a domain associated with the service provider. Once called, the domain may allow the service provider to infer that permission has been granted and what the permission is (e.g., length of time, selected or all websites for monitoring and/or access, and the like). The service provider may therefore determine the permissions for the user for future use of the extension with the mobile web browser application.

For example, a user may wish to view and/or use available discounts and savings with websites and process a purchase of one or more items in a transaction. Selection of one or more savings and/or items during an online transaction with a merchant website may require a payment instrument from the user for electronic transaction processing. A user may view savings and pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items. However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. The transaction processor may track the data over a plurality of visited websites, online resources, and/or applications, for example, using an application plugin, an application extension, or an application add-on, as well as mobile applications and other resident device applications, provided by a digital platform associated with the transaction processor (e.g., HONEY® or another web browser add-on). The transaction processor may therefore determine transaction data on a merchant website based on interactions the user performs through their computing device with the merchant website. The transaction processor may track this data through one or more application programming interface (API) integrations between different applications, microservices, decision services, and/or digital platforms of the transaction processor's system. The API integrations may allow for API calls and requests to be executed to track, request, and/or receive data from different platforms and operations of those platforms with merchant websites.

In order to enable these API calls, exchanges, and integrations to monitor website data and provide discounts, savings, and other transaction processing services, the service provider and the corresponding web browser extension may be required to obtain, maintain, and utilize an opt-in permission or other grant of access to data from the web browser application and/or exchanged with the web browser application. In this regard, a web browser extension for the service provider may be downloaded. This may correspond to a mobile application and/or mobile application extension that may be available from navigating to a website, searching and browsing an application store or marketplace of available applications, and/or receiving a text, email, or other message. Once downloaded, the user may open and execute the extension, and may engage in a process to enroll with the service provider, generate an account, and/or login to the user's account. Thereafter, the user may be required to select and/or provide opt-in permissions for use of the web browser extension with one or more mobile web browser applications on the user's mobile device. This may be done through the application and/or extension for the service provider, which initially may cause the web browser application to open and/or navigate to a webpage of the service provider.

For example, the webpage may allow the service provider to determine that the user is requesting an opt-in and/or providing a permission. The webpage may correspond to a "join service provider" webpage, where the user can elect to provide a permission and opt into services and use of the web browser extension with the web browser applications on the user's device. The webpage may also allow the user to review permissions and to enable opt-in on a specific domain of the service provider. Further, when the web browser application lands on this specific webpage and/or domain, the web browser application may request that the user grants access to the web browser extension for the webpage. Access may be provided by selecting an interface element to enable permissions and opt-in to use of the web browser extension with the web browser application. Once access has been provided, the web browser extension may then inject an iframe to the webpage in the web browser application. An iframe or inline frame may correspond to a hypertext markup language (HTML) document that is embedded in another HTML document, such as the webpage that the web browser application lands on and is displayed. Iframes may be used to insert content from another source or webpage into a displayed webpage.

In this regard, the iframe injected and/or embedded by the web browser application to the webpage of the service provider that is accessed for the opt-in permission may be used to point to and/or open another domain or webpage of the service provider that loads content associated with the granted permission. The iframe may call a server of the service provider to load webpage content from a different domain that allows the web browser extension and/or the service provider's server to determine an opt-in permission granted by the user. For example, with the web browser extension, a script of the web browser extension loaded on the iframe may determine and/or infer that the opt-in permission was granted. When the web browser extension is granted access to all domains or a subset of domains, the web browser extension may then be automatically injected into additional webpages and iframes. Thus, when the extension is injected on an iframe on a webpage, the extension may then infer that the extension was granted the permission without having to check with the service provider's server.

When injecting the iframe and/or embedding the HTML document for the secondary domain of the service provider that allows the extension and service provider to infer permission states and/or opt-ins, the user may select a type of and/or preferences for an opt-in and/or permission granted by the user. The permission may be for an amount of time (e.g., the current day or the next week, month, etc.) and/or for specific websites for merchants and/or marketplaces. The permission may also be a general opt-in permission that allows permanent access and/or for all websites until an opt-out preference request to end the permission occurs. Further, the selectable permissions shown on the webpage and/or by the extension may include both opt-in and/or opt-out requests. After selection of the permission, the mobile web browser extension may execute a script. The script is loaded and executed within the iframe to infer the permission granted to the web browser extension based on the loaded domain. The script may correspond to an HTML JavaScript script that loads on the iframe and infers that the user has granted the corresponding opt-in permission and/or is requesting an opt-out. The script may be found in the application manifest or file(s) for the web browser extension and may be used to communicate with the corresponding server of the loaded domain in the iframe. The script may inform the service provider's server(s) of the granted permission (or opt-out) and may allow the extension to infer the granted permissions and opt-in preferences when loading on the iframe with the domain.

Once the script is loaded and executed with the iframe, the permissions granted by the opt-in are then inferred and determined by the web browser application extension for use with one or more web browser applications on the user's device. The extension and aforementioned processes for providing the opt-in permission and preferences may further be used to update the permissions and change the permissions during further use. The web browser application extension may then interface with the web browser application(s) and/or other applications on the user's device. Using the web browser extension (e.g., for a web browser that accesses merchant websites) and/or a resident dedicated application, online transaction processor or other service provider may detect when items are browsed on a merchant website or marketplace, when items are added to a digital shopping cart and/or entered to a transaction for processing, and/or when a checkout total for a transaction is finalized on a merchant website. Initially, the transaction processor may scrape, extract data from, and/or map the merchant website, item searching and/or browsing webpages, and/or checkout webpages on the merchant website. The transaction processor may parse through the domain object model (DOM) tree and determine the webpage elements, fields, menus, and the like as HTML and/or extensible markup language (XML) code snippets that identify items that are browsed and/or transactions that are engaged in by the user on merchant websites.

The transaction processor may determine when items are browsed, transaction are generated, and data for those items and transactions. For example, the webpage may include elements for item and/or transaction data fields for items, item costs, item descriptions, shipping information, billing information, shipping cost, tax, tip, and the like. The service provider may receive this data and execute one or more internal or external searches or queries for discounts and other savings. These savings may then be populated by the web browser extension with the merchant webpages in the web browser application on the user's device. This may include altering webpage fields and/or elements, inserting savings into one or more discount fields, or entry options, and/or presenting discount codes or other saving information with or on the webpages of the merchant website. Thus, a service provider may provide for web browser extension integrations and interoperability with different web browser applications in a coordinated manner to provide opt-ins and permissions. This may be done in an automated manner to provide faster opt-ins and permission granting by users. These features allow mobile web browser extensions to be run on mobile devices and with mobile web browser applications. As such, the service provider may facilitate permissions for use with mobile applications and extensions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a mobile device 110, a service provider server 120, and websites 140 in communication over a network 150. Mobile device 110 may be used to browse items on websites 140, generate transactions, and/or process payments, such as through a payment platform, application, and/or application extension, which may be facilitated through digital accounts and processing operations of service provider server 120. Mobile device 110 may be used to enable permissions for service provider server 120 to provide discounts, savings, and the like in a web browser application 112 through a mobile web browser extension 114. Thus, mobile device 110 and service provider server 120 may interact to enable these permissions through opt-in operations discussed herein.

Mobile device 110, service provider server 120, and websites 140 may each include or be executed using one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Mobile device 110 may be implemented using any appropriate hardware and software configured for wired and/or wireless communication with service provider server 120 and/or websites 140 for processing payments and transactions using savings provided by service provider server 120. Mobile device 110 may correspond to an individual user, consumer, or merchant that utilizes a savings service and/or payment network and platform provided by service provider server 120. In various embodiments, mobile device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Mobile device 110 of FIG. 1 contains web browser application 112, a database 116, and a network interface component 118. Web browser application 112 may correspond to executable processes, procedures, and/or applications with associated hardware. In other embodiments, mobile device 110 may include additional or different software as required.

Web browser application 112 may correspond to one or more processes to execute modules and associated devices of mobile device 110 to provide a convenient interface to permit a user for mobile device 110 to view websites 140 including merchant websites where the user may enter, view, and/or process items the user wishes to purchase in a transaction. In this regard, web browser application 112 may correspond to specialized hardware and/or software utilized by mobile device 110 that may provide for website and item browsing, as well as transaction processing for the items. Viewing, browsing, and interacting with websites 140 may be done through one or more user interfaces of web browser application 112 enabling the user to access websites 140 and enter and/or view the items that the user associated with mobile device 110 wishes to purchase. This may be based on a transaction generated by web browser application 112 using a merchant website provided by websites 140. Web browser application 112 may also be used by a user to provide payments and transfers to a second user or merchant. For example, web browser application 112 may utilize user financial information, such as credit card data, bank account data, or other funding source data, as a payment instrument when providing payment information. Additionally, web browser application 112 may utilize a digital wallet associated with an account with service provider server 120 as the payment instrument, for example, through accessing a digital wallet or account of a user through entry of authentication credentials and/or by providing a data token that allows for processing using the account. Web browser application 112 may also be used to receive a receipt or other information based on transaction processing.

In various embodiments, web browser application 112 may correspond to a general web browser application configured to retrieve, present, and communicate information over the Internet (e.g., utilize resources on the World Wide Web) or a private network. For example, web browser application 112 may provide a web web browser, which may send and receive information over network 150, including retrieving website information, presenting the website information to the user, and/or communicating information to the website, including payment information for the transaction. Web browser application 112 may correspond to a mobile web browser application, such as one provided on mobile smart phones including SAFARI® on iOS. Web browser application 112 may include mobile web browser extension 114 that may correspond to a data tracker and web browser plug-in or extension used to track data for a user associated with mobile device 110 when the user interacts with different online platforms and entities including merchants and marketplaces for websites 140. Mobile web browser extension 114 may correspond to an operation of web browser application 112 and/or an application or web browser extension, add-on, or plug-in. Mobile web browser extension 114 may include operations to parse, monitor, and track data on a merchant website in order to determine whether one or more discounts, rebates, coupons, or savings are available with the merchant website and/or items of interest to the user on the merchant website. Further, mobile web browser extension 114 may be used to add or insert savings to a transaction, for example, by entering a savings alphanumeric code, bar or QR code, text, data, or the like to a webpage field and/or option that causes the savings to be applied to and reduce a cost of a transaction. In some embodiments, mobile web browser extension 114 may be provided by HONEY®.

For example, mobile web browser extension 114 (e.g., web browser extension and/or monitoring process) of web browser application 112 may then use the script to parse a DOM tree, identify webpage elements and HTML or XML code for items and/or transactions, and/or monitor webpage data, fields, and operations. Mobile web browser extension 114 may be required to receive an opt-in and permission from a user of mobile device 110 in order to interface with web browser application 112, monitor website data, and output savings during item browsing, shopping, and/or transaction processing. In this regard, mobile web browser extension 114 may first be installed and opened on mobile device 110 and a user may be onboarded for mobile web browser extension 114 and service provider server 120. Thereafter, when mobile web browser extension 114 is opened and executed, mobile web browser extension 114 may cause web browser application 112 to open and load a webpage of service provider server 120 for a specific domain for onboarding and opt-in. Mobile web browser extension 114 may then inject or embed an iframe to the webpage visited by web browser application 112. This iframe may point to and cause loading of webpage data on another secondary domain of service provider server that may execute calls to service provider server 120 to opt-in and enable permissions for use of mobile web browser extension 114 with web browser application 112. A script in a manifest for mobile web browser extension 114 may then execute on or with the iframe, which may cause mobile web browser extension 114 to infer permission has been granted for use with web browser application 112 and what the corresponding parameters or preferences for the permission and opt-in are. Once the script executes, mobile web browser extension 114 and service provider server 120 may then infer and determine the permissions and may execute to provide the aforementioned savings processes and operations for use with web browser application 112 and websites 140 in line with the permissions.

Mobile device 110 may further include database 116 which may include, for example, identifiers such as operating system registry entries, cookies associated with web browser application 112 and/or other applications, identifiers associated with hardware of mobile device 110, or other appropriate identifiers. Identifiers in database 116 may be used by a payment/service provider to associate mobile device 110 with a particular account maintained by the payment/service provider. Database 116 may also further store received transaction data, as well as processed transaction data. In various embodiments, a script and other data for a manifest of mobile web browser extension 114 may be stored by database 116.

Mobile device 110 includes at least one network interface component 118 adapted to communicate with service provider server 120, websites 140, and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for monitoring mobile device 110's interactions with websites 140 to provide discount and payment savings services discussed herein. Various embodiments of the system described herein may be provided by service provider server 120 and may be accessible by mobile device 110 when accessing websites 140. In such embodiments, service provider server 120 may interface with mobile device 110 for monitoring websites and providing savings during item browsing and electronic transaction processing. Service provider server 120 includes one or more processing applications which may be configured to interact with mobile device 110 and websites 140, such as using mobile web browser extension 114 with web browser application 112. In one example, service provider server 120 may be provided by PAYPAL® and/or HONEY®. However, in other embodiments, service provider server 120 may be maintained by or include another type of service provider.

Service provider server 120 of FIG. 1 includes mobile extension platform 130, service applications 122, a database 124, and a network interface component 128. Mobile extension platform 130 and service applications 122 may correspond to executable processes, procedures, and/or applications with associated hardware. In other embodiments, service provider server 120 may include additional or different modules having specialized hardware and/or software as required.

Mobile extension platform 130 may correspond to one or more processes to execute modules and associated specialized hardware of service provider server 120 to provide data, operations, and processes to monitor mobile device 110's interactions with websites 140 using mobile web browser extension 114 and provide discounts, rebates, coupons, and other available savings for electronic transaction processing by mobile device 110 with one or more of websites 140. In this regard, mobile extension platform 130 may correspond to specialized hardware and/or software used by a user associated with mobile device 110 to establish an account with mobile extension platform 130 and/or access another account with service provider server 120. For example, an account provided by HONEY® may be provided by service provider server 120 via mobile extension platform 130 and/or service applications 122. However, a more general account (e.g., a PAYPAL® account) may also provide the aforementioned account services and be utilized when performing webpage monitoring and provision of savings based on websites, items on websites, transactions, and the like. Mobile extension platform 130 may correspond to a product of service provider server 120 that may be utilized by end users to receive savings during transaction processing. Mobile extension platform 130 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Mobile extension platform 130 may include one or more APIs that perform API calls and requests, and receive responses, in order to perform website monitoring and saving offer services.

For example, mobile extension platform 130 includes an extension processing application 132 that may be used to parse a merchant website to identify data for items or transactions that may be used to determine one or more savings that may be applied to transactions for processing. Mobile extension platform 130 may parse through the merchant website and determine data and elements that need to be monitored and/or may be used to search for and provide savings for use with websites 140. In order to parse websites 140 when accessed by mobile device 110 via web browser applications 112, permissions 134 may be required to allow mobile web browser extension 114 to monitor data and mobile extension platform 130 to receive monitored data 136. To enable permissions 134, mobile web browser extension 114 may first access a webpage and/or domain provided by mobile extension platform 130. Mobile web browser extension 114 may then inject an iframe that may call and load data from another domain provided by mobile extension platform 130, and a script of mobile web browser extension may then execute and run with that domain in the iframe. Permissions 134 may then be inferred by mobile web browser extension 114 and provided to mobile extension platform 130 for association with the user's account and/or use when determining savings for use by mobile device 110 with websites 140.

Thereafter, mobile extension platform 130 may determine monitored data 136 and a savings process or operations may be implemented to determine and apply additional savings to the transaction, such as offers 138 for one or more discounts, rebates, coupons, or other savings to apply to one or more transactions. Offers 138 may include available savings, which may be provided to mobile device 110 for use with a transaction. After applying any additional savings, a checkout total may be finalized based on the transaction and offers 138. Thereafter, once a checkout total is determined and finalized, the checkout total may be processed, for example, using one or more of service applications 122. Service applications 122 may determine the transaction, which may be processed through web browser application 112 of mobile device 110. Thereafter, web browser application 112 may interface (e.g., via one or more API calls, requests, and/or responses) with service applications 122 and/or one or more of websites 140 in order to facilitate processing of the transactions having one or more of offers 138 applied to the transactions.

Service applications 122 may correspond to one or more processes to execute modules and associated specialized hardware of service provider server 120 to process a transaction or provide another service to customers or end users of service provider server 120. In some embodiments, service applications 122 may be used by a user associated with mobile device 110 to establish a payment account and/or digital wallet, which may be used to process transactions. In various embodiments, financial information may be stored to the account, such as account/card numbers and information. A digital token for the account/wallet may be used to send and process payments, for example, through an interface provided by service provider server 120. The payment account may be accessed and/or used through a web browser application/extension and/or dedicated payment application executed by mobile device 110 and engage in transaction processing through service applications 122. In various embodiments, service applications 122 may be used to process a transaction having savings applied by mobile web browser extension 114 based on monitored data 136, offers 138, and websites 140, such as by interfacing with mobile device 110 through one or more API calls and the like. Service applications 122 may process the payment and may provide a transaction history to mobile device 110 for transaction authorization, approval, or denial. However, in other embodiments, service applications 122 may instead provide different computing services, including social networking, microblogging, media sharing, messaging, business and consumer platforms, etc.

Service applications 122 as may provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to more easily view and communicate information. In various embodiments, service applications 122 may include additional connection and/or communication applications, which may be utilized to communicate information to over network 150.

Additionally, service provider server 120 includes database 124. Database 124 may store various identifiers associated with mobile device 110. Database 124 may also store account data, including payment instruments and authentication credentials, as well as transaction processing histories and data for processed transactions. Database 124 may store received data associated with a user for use in determining offers 138. Database 124 may store extension, manifest, and/or script data for mobile web browser extension 114. In this regard, extension and account data 126 may be stored by database 124 and for use with mobile device 110 and websites 140.

In various embodiments, service provider server 120 includes at least one network interface component 128 adapted to communicate mobile device 110, websites 140, and/or another device/server for a merchant over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Websites 140 may correspond to one or more online websites and associated resources to provide features, services, and other operations for a merchant, seller, or the like to market and provide items for sale and process sales and checkout purchases. In this regard, websites 140 may be utilized by one or more merchants to provide websites and/or online portals for transaction processing and sales. For example, websites 140 may be used to host a website having one or more webpages that may be used by customers to browse items for sale and generate a transaction for one or more items. Websites 140 may provide a checkout process, which may be utilized to pay for a transaction. In some embodiments, the checkout process may be provided by service provider server 120 based on one or more operations, SDKs, and the like that may be implemented in the merchant website. The checkout process may be used to pay for a transaction using a payment instrument, including a credit/debit card, and account with service provider server 120, or the like. Websites 140 may be utilized by customers and other end users to view one or more user interfaces (UIs), for example, via graphical UIs (GUIs) presented using an output display device of mobile device 110. These UIs may be used to navigate through items for sale on the merchant website, generate a transaction, and checkout for the transaction on the merchant website. Further, websites 140 may be processed and/or parsed to scrape and/or extract data by mobile web browser extension 114 when viewing items and/or engaging in electronic transaction processing. Thus, service provider server 120 may output savings for use with websites 140 when browsing item and engaging in transaction processing in web browser application 112 on mobile device 110 using mobile web browser extension 114.

In order to provide checkout services, websites 140 may include item, marketplace, and/or checkout process for websites 140. The elements may correspond to webpage elements within one or more webpages that provide the operations, input fields, menus, and the like to view and/or search for items, browse items, add items to digital shopping carts, and/or complete a checkout. Elements may include HTML or XML code snippets and the like that may be parsed and data may be monitored by mobile web browser extension 114. The elements may include elements for items, coupons or savings, shipping, billing, name, account identifier, item total, sales tax, tip, shipping costs, and the like. Service provider server 120 may initially parse the elements and may determine whether any of the elements indicate an intent to purchase and/or items for purchase, which may be used to determine whether to provide and/or process one or more of offers 138 with the transaction.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
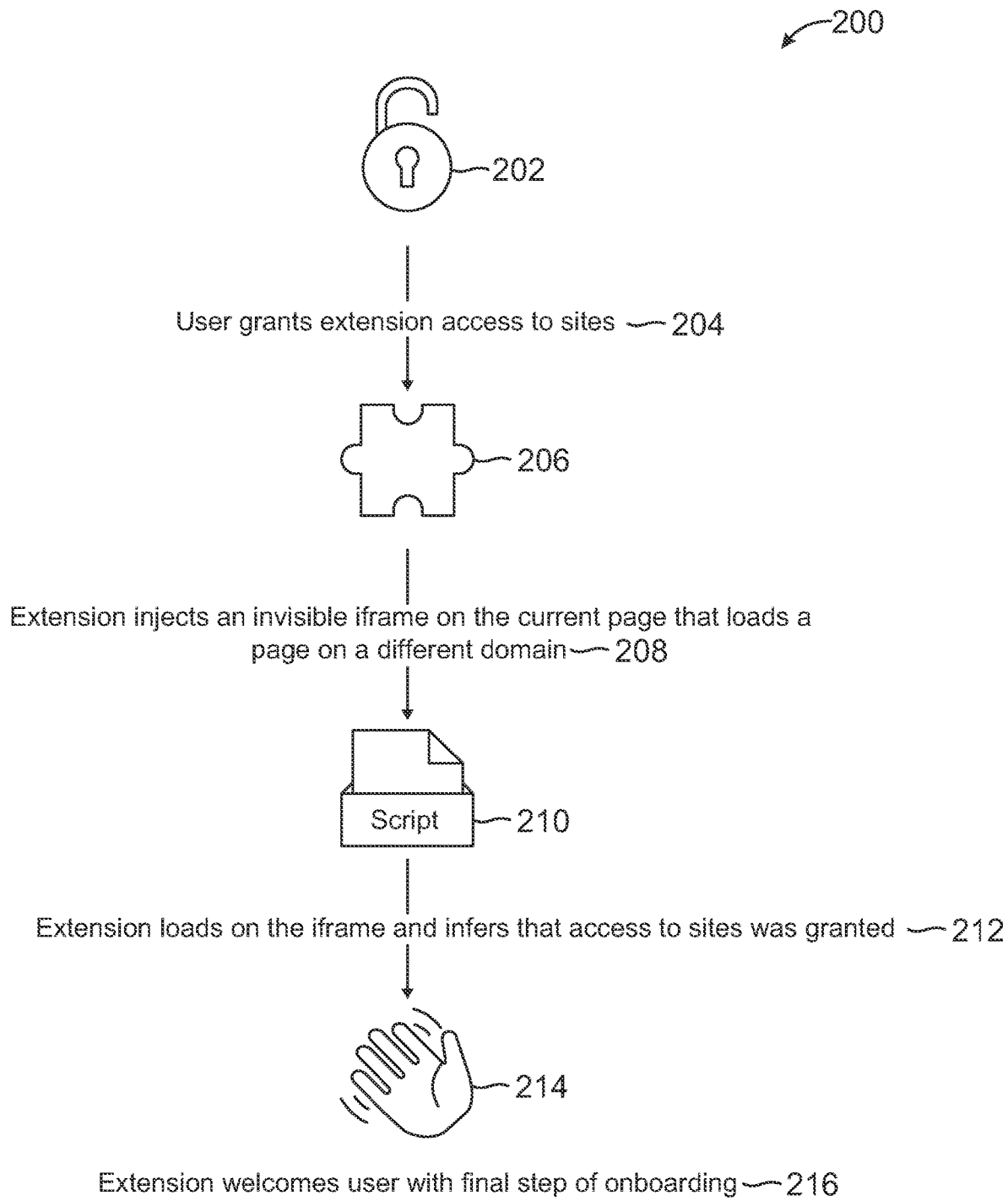
FIG. 2 is exemplary diagram of operations to perform a web browser extension opt-in with a mobile web browser application using an injected iframe on a webpage and an executable script, according to an embodiment.

FIG. 2 is exemplary diagram 200 of operations to perform a web browser extension opt-in with a mobile web browser application using an injected iframe on a webpage and an executable script, according to an embodiment. Diagram 200 includes operations that may be performed by a computing device when opting-in to use of and permissions for a web browser extension to interface with a web browser application, such as those performed by mobile device 110 when opting-in for mobile web browser extension 114 to be used with web browser application 112 discussed in reference to system 100 of FIG. 1.

In diagram 200, during an opt-in phase 202, a user may access a mobile application extension and execute the mobile application extension on a corresponding computing device, such as a mobile smart phone. Opt-in phase 202 may include onboarding a user for use of the mobile application extension and/or an account that may be used with the mobile application extension or may include logging in to the user's account. An interface may be displayed for the application extension and/or web browser application, which allows onboarding and/or login to the account. Thereafter, at a permissions phase 204, the user may grant the mobile web browser extension access to websites generally or may instead elect permissions to certain websites and/or for an amount of time. The permissions provided during permissions phase 204 may correspond to an opt-in to allow the extension access to, interfacing with, and monitoring of website data and user interactions with websites in one or more web browser applications on the user's device. The opt-in may be required for mobile device and mobile web browser applications, including SAFARI® on iOS-based devices.

Next, a webpage loading phase 206 may be executed by the web browser extension with the web browser application. During webpage loading phase 206, a webpage may be accessed and loaded for the service provider corresponding to the extension. The service provider may require the permission to operate the extension with web browser applications on the user's mobile device, and may provide a landing page (e.g., a join webpage for the service provider) where the user may provide their permissions and a process for use with the web browser extension may determine and/or infer permissions have been granted. At an iframe injection phase 208, an iframe is injected to the webpage that is landed on by the web browser application when the opt-in is requested via the web browser extension. The iframe may be injected by embedding HTML code for an HTML document to the HTML code of the webpage in the web browser application (e.g., the webpage that was landed on in response to providing the opt-in and/or permission). The injected and/or embedded HTML document for the iframe may execute a call to load data and/or a webpage for another domain of the service provider that calls a server and informs the server that the opt-in has been selected and requested.

During a script fetching phase 210, a script for the extension that allows the extension to infer that permission has been granted is fetched and received. The script may be found and/or located in an application manifest or other application file for the web browser extension. Once fetched, at a script execution phase 212, the script is executed and the script and/or extension is loaded on the iframe. When loading the script and/or extension on the iframe, the extension may infer that permissions have been granted and what the permissions are using the domain that was called in the iframe. This allows the extension to determine the opt-in has been granted and/or allowed and that the extension may operate with the web browser application. Thereafter, a welcome phase 214 may display an interface that indicates that the user has completed their permissions and opt-in and that the user may adjust to change their permissions as needed. During an onboarding finalization phase 216, the user may provide any additional data necessary for onboarding and/or complete final onboarding procedures.

Once completed the user may then utilize the web browser extension to receive data while browsing websites, which may include offers and savings for electronic transaction processing. The web browser extension may have been provided a universal and/or general website access, which may allow use of the web browser extension with all websites browsed by the web browser application and/or until an opt-out is requested to remove or disable the permission for use of the web browser extension with the web browser application. However, in further embodiments, the user may elect to opt-in to only one or more specific websites and/or for a limited amount of time. In such embodiments, different injected iframes, scripts, and/or domains loaded in an iframe may be used to individually elect, and/or elect as a group, one or more websites designated by the user and/or the amount of time that the web browser extension is enabled for the opt-in permission. The web browser extension may therefore infer different preferences and/or levels of permissions granted based on elections by the user during opt-in.

Figure 3A:
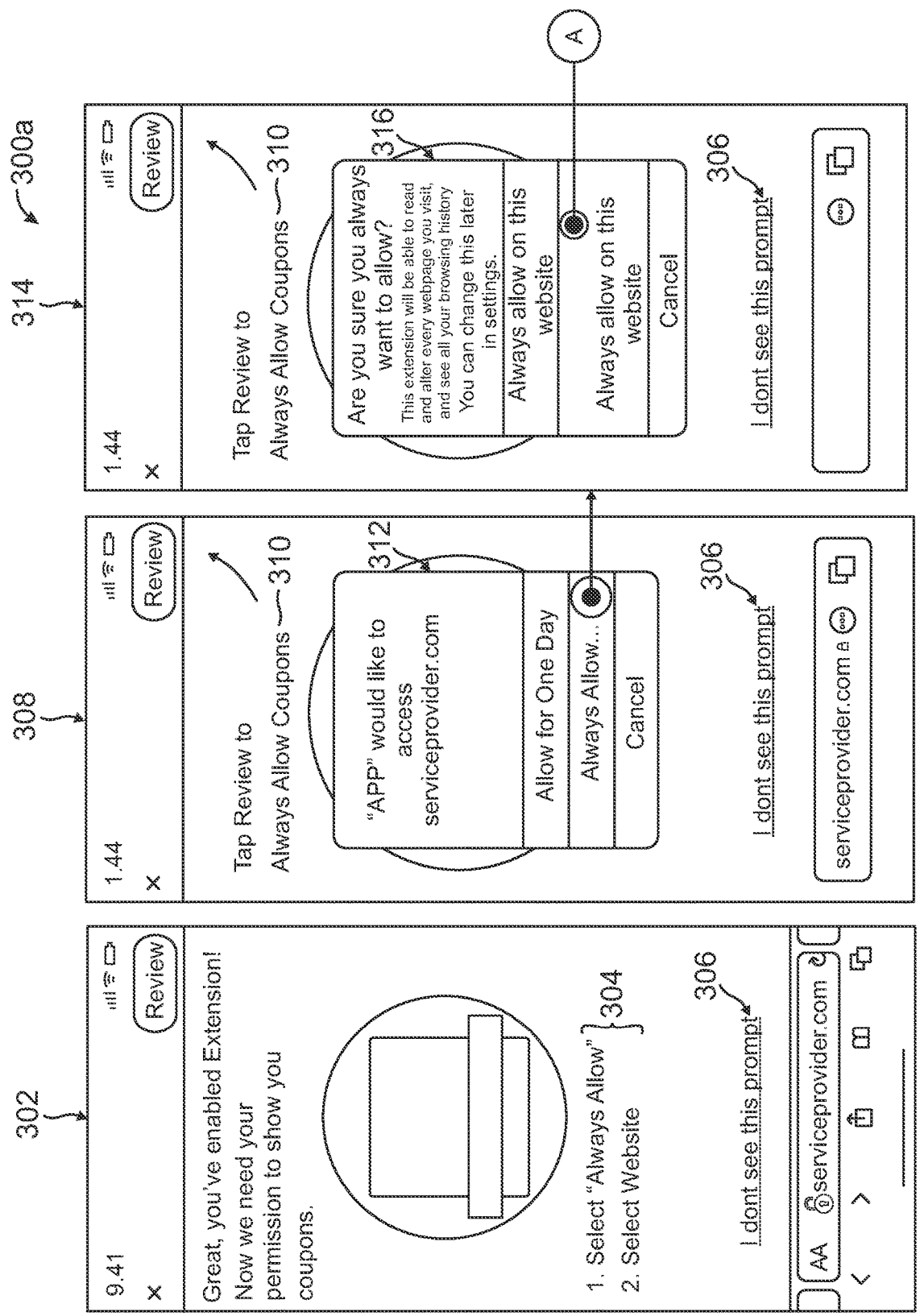
FIG. 3A-3B are exemplary user interfaces displaying a website that uses an injected iframe to execute a call to a domain for mobile application extension opt-in, according to an embodiment.
Figure 3B:
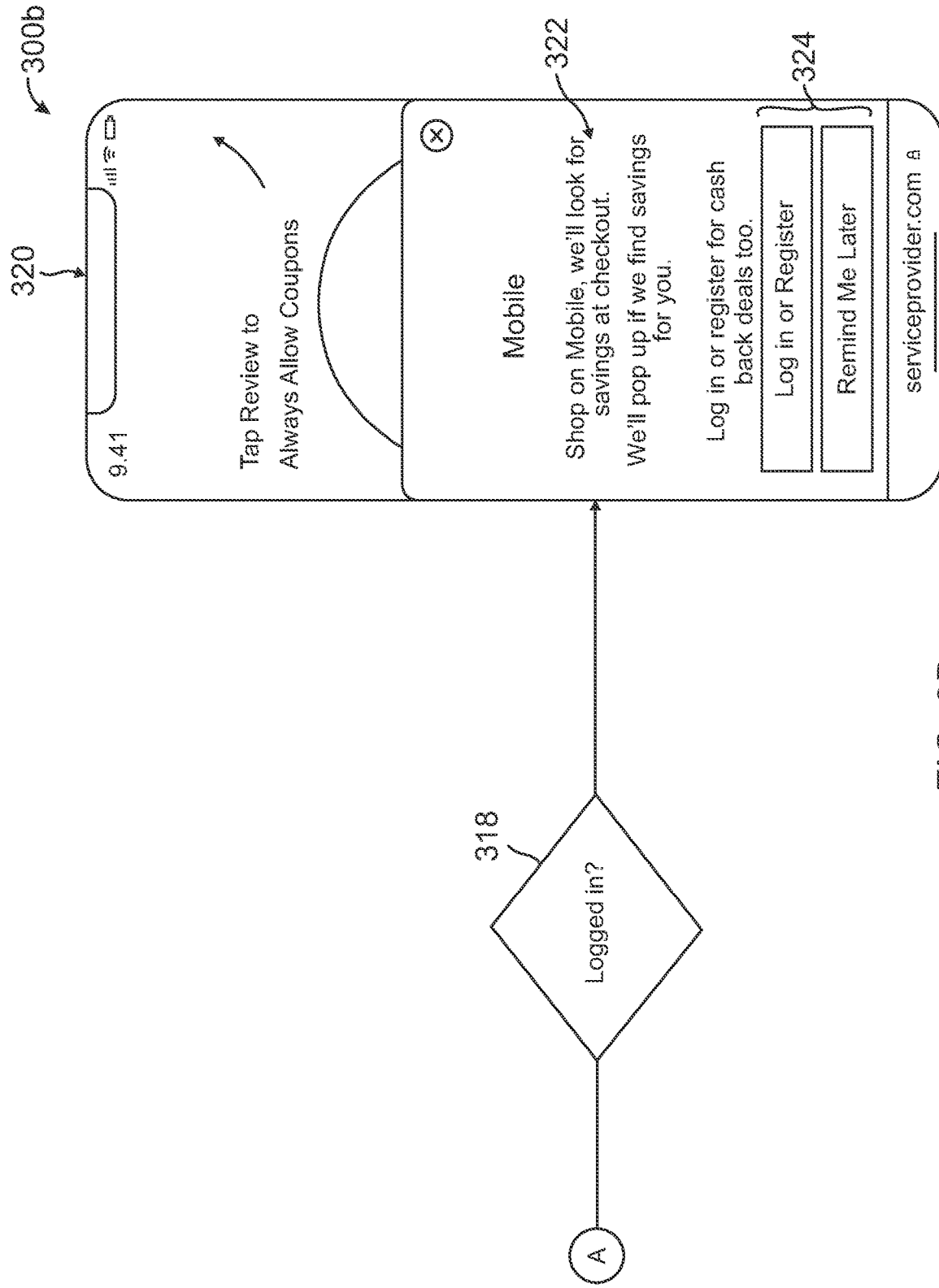

FIG. 3A-3B are exemplary user interfaces 300a and 300b displaying a website that uses an injected iframe to execute a call to a domain for mobile application extension opt-in, according to an embodiment. User interfaces 300a of FIG. 3A may be displayed by mobile device 110 discussed in reference to system 100 of FIG. 1. In this regard, mobile device 110 includes user interfaces 300a displayed by one or more applications and/or application extensions in response to a request to opt-in to use of a web browser extension with a web browser application on mobile device 110.

User interfaces 300a on mobile device 110 display a first user interface 302 where a user may provide permissions for an application extension to interact with and determine permissions when opting-in to use of the application extension with another application on mobile device 110. When displaying first user interface 302, a user is allowed to select between permissions 304, which allows a user to set their preferences for opting-in to use of the extension with a corresponding application, such as the level and/or number of allowable interactions of a web browser extension with a web browser application. Permissions 304 may be displayed when a webpage is accessed via a web browser application in first user interface 302 such that permissions 304 are displayed on the webpage and correspond to selectable webpage elements or fields to set the corresponding parameters of the opt-in preferences for permissions 304. Further, a reload option 306 is provided in order to refresh or reload first user interface 302.

In response to a selection from permissions 304, a user may then view a message 310 in a second user interface 308 informing the user that the user may select from first menu options 312 to enable a permission for interoperability of the application extension with the corresponding application. First menu options 312 provide a menu of selectable options where the user may enter the corresponding preferences and/or options for the opt-in permission, how long the opt-in permission may remain, and/or the allowable data that may be accessed by the opt-in permission. Second user interface 308 may display a webpage for a service provider in a background, where the application extension may inject an iframe that causes another domain to be called for first menu options 312. Thus, the iframe may allow a script to be executed with the other domain called and loaded in the iframe.

As shown in second user interface 308, an "Always allow" permission is selected, which may cause a third user interface 314 to be loaded. In third user interface 314, the iframe may progress from first menu options 312 to second menu options 316, which allow the user to further select opt-in preferences and parameters for the permission in the corresponding iframe. The iframe may therefore include the corresponding data loaded from the domain that is loaded and executed with using the script of the application extension. The script of the application extension may be loaded and executed from an application manifest of the extension.

In third user interface 314, a selection to always allow opt-in permissions of the application extension with a corresponding application on the present website is selected within the displayed iframe. Thereafter, user interfaces 300a may proceed to user interfaces 300b (shown in FIG. 3B) where a login decision 318 is determined. Login decision 318 may determine whether the user is presently logged in with a service provider corresponding to the application extension. In this regard, if logged in, the user may then proceed to utilize the application extension with the corresponding application. In a fourth user interface 320, onboarding options 322 are displayed within the iframe. Onboarding options 322 allow a user to complete onboarding data fields 324 where a user may either login, establish an account, or delay login for future entry. Thereafter, the user may utilize the application extension with the application on mobile device 110.

Figure 4:
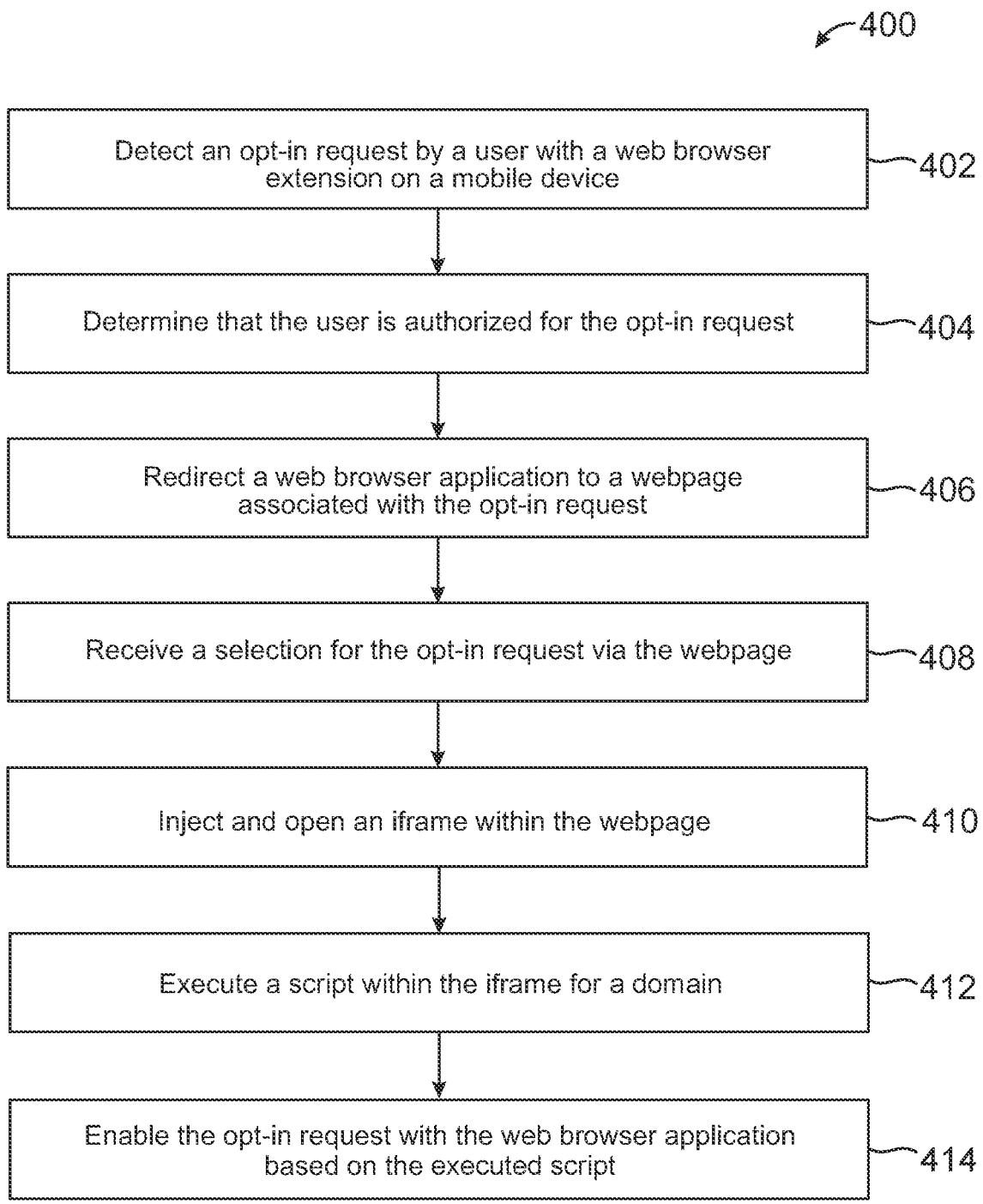
FIG. 4 is a flowchart for processes utilized for iframe injection in mobile web browser applications for web browser extension opt-in, according to an embodiment.

FIG. 4 is a flowchart 400 for processes utilized for iframe injection in mobile web browser applications for web browser extension opt-in, according to an embodiment. Note that one or more steps, processes, and methods described herein of flowchart 400 may be omitted, performed in a different sequence, or combined as desired or appropriate.

At step 402 of flowchart 400, an opt-in request by a user with a web browser extension on a mobile device is detected. The opt-in request may be detected based on the user downloading, opening, and/or executing the web browser extension on the user's mobile device. In response to this detection, at step 404, it is determined that the user is authorized for the opt-in request. Determination of whether the user is authorized for the opt-in request may be based on whether the user is onboarded with and/or signed-in to an account with the corresponding service provider for the web browser extension. In this regard, if the user is not onboarded and/or does not have an account with the service provider, the user may go through an onboarding phase where the user may provide relevant details and obtain an account to use with the service provider and the services provided by the service provider. Such services may include those available with receiving discounts and savings for use with online merchants and/or completing electronic transaction processing using a digital account and one or more payment instruments.

At step 406, a web browser application is redirected to a webpage associated with the opt-in request. Redirection to this webpage may occur based on the user's request for the opt-in and granting of permissions for the web browser extension to operate and integrate with the web browser application. The webpage may correspond to a landing webpage where a user may be able to elect permissions to opt-in to use of the web browser extension with the web browser application. For example, a general homepage and/or landing page to signup, onboard with, and/or opt-in to the web browser extension may be loaded in the web browser application on the user's device. The webpage and/or an interface of the web browser extension may then request that the user provide their opt-in and/or their preferences and parameters for their opt-in and permissions. At step 408, a selection for the opt-in is received via the webpage. For example, the user may select that the user generally grants all permissions for use of the web browser extension with one or more web browser applications on the user's mobile device. However, the user may also elect how long the user is opting-in for use of the extension and/or the website with which the extension may function, monitor data, and/or provide data, offers, or information. In this regard, the user may select the websites that the user would like the extension to process and provide savings, or the user may allow for all websites.

At step 410, an iframe is injected and opened within the webpage that is loaded in the web browser application. Injection of the iframe may include embedding an HTML, document or other code of the iframe to the currently opened webpage of the service provider. The iframe may allow for another call to be executed to another domain hosted by the service provider's servers and may retrieve webpage data and the like from such servers, databases, and/or other online resources. The iframe may return data and a response to the call, which may correspond to the data from the server loaded based on the accessed domain in the injected iframe. The response may further include information about the elected permission for the opt-in and may allow the web browser extension and/or the service provider's servers to infer the permission granted to the web browser extension by the user. The loaded data from the response may be determined and received by a script executed by the web browser extension in the iframe.

Once injected, at step 412, a script is executed within the iframe for a domain. In this regard, a script in a manifest of the web browser extension may execute in the iframe to infer a granted permission based on the domain and/or data loaded in the iframe. In some embodiments, the loaded data may be used to infer the granted permission and/or the script may make a call to a server and infer that permissions have been granted based on the loaded domain within the iframe and corresponding server. The script may correspond to a JavaScript script in one or more application manifests and/or files of the extension. At step 414, the opt-in request, and corresponding permissions, are enabled with the web browser application based on the executing the script in the iframe. The opt-in request that is enabled may be for the web browser extension and allow the web browser extension to integrate and operate with the web browser application. The opt-in request may allow the web browser extension to monitor website data and interactions with websites by the user on the mobile device and in the web browser application. This then allows the web browser extension to provide data within the web browser application when websites are accessed and browsed. This data may include offers and savings that may be provided during electronic transaction processing on these websites.

Figure 5:
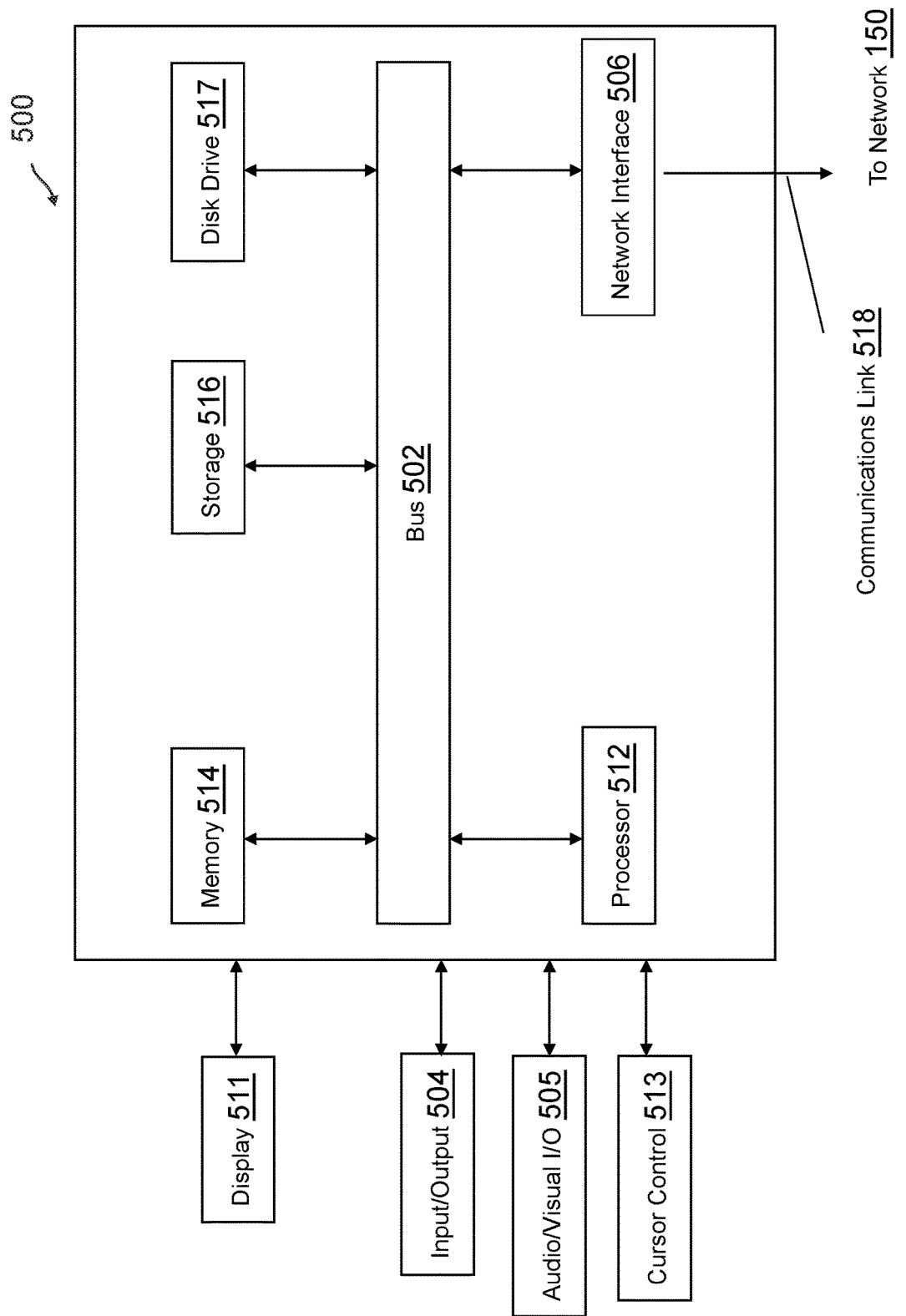
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on iframes, mobile web browsers, and webpages, other types of injectable coded data, applications, and sources are also within the scope of various embodiments of the invention. Thus, the present disclosure is limited only by the claims.

What is claimed is:

1. A mobile device system comprising:
   a non-transitory memory; and
   one or more hardware processors coupled to the non-transitory memory and configured to read instructions from the non-transitory memory to cause the mobile device system to perform operations comprising:
   detecting, via a mobile web browser extension on the mobile device system of a user, that the user is requesting an opt-in permission for a use of the mobile web browser extension with a mobile web browser application on the mobile device system;
   redirecting the mobile web browser application to a webpage associated with a first domain enabling the opt-in permission for the use of the mobile web browser extension with the mobile web browser application;
   injecting an iframe into the webpage that enables the webpage to load a second domain associated with the mobile web browser extension, wherein the injecting comprises:
      embedding hypertext markup language (HTML) code that directs the webpage to the second domain in the mobile web browser application on the webpage, wherein the iframe is loaded by the HTML code when directing to the second domain,
      executing a call to the second domain for a permission grant level set by the user, and
      in response to the executing the call, executing a script from an application manifest of the mobile web browser extension for the opt-in permission within the iframe;
   inferring the permission grant level for the use of the mobile web browser application based on the executed script and the call to the second domain for the permission grant level; and
   setting the opt-in permission for the use of the mobile web browser extension with the mobile web browser application based on the permission grant level.

2. The mobile device system of claim 1, wherein the operations further comprise:
   determining that the opt-in permission is enabled for the mobile web browser extension;
   detecting a navigation to a website using the mobile web browser application; and
   determining website data for the website using the mobile web browser extension.

3. The mobile device system of claim 2, wherein the operations further comprise:
   providing, via the mobile web browser extension, an offer to the user for the website based on the website data.

4. The mobile device system of claim 2, wherein the website data comprises at least one of shopping cart data for a digital shopping cart or transaction data for a transaction processable on the website.

5. The mobile device system of claim 3, wherein the offer comprises at least one of a discount, a rebate, or an incentive for a transaction processed on the website.

6. The mobile device system of claim 1, wherein prior to the injecting, the operations further comprise:
   displaying, on the webpage, opt-in preferences for the opt-in permission; and
   receiving a designation of one of the opt-in preferences via the webpage,
   wherein the iframe is injected and the script is executed based on the designation.

7. The mobile device system of claim 6, wherein the opt-in preferences comprise a first permission to enable the mobile web browser extension with one or more selected websites accessed by the mobile web browser application, a second permission to enable the mobile web browser extension with all websites accessed by the mobile web browser application, or a third permission to opt-out of use of the mobile web browser extension with the mobile web browser application.

8. The mobile device system of claim 6, wherein the operations further comprise:
receiving a navigation to a website by the mobile web browser application; and
determining if the mobile web browser extension is enabled for the website based on the designation of the one of the opt-in preferences.

9. The mobile device system of claim 8, wherein the mobile web browser extension is enabled for the website, and wherein the operations further comprise:
determining website data for the website and user interaction data by the user with the website;
transmitting the website data and the user interaction data to a service provider server associated with the mobile web browser extension;
receiving offer data associated with the website based on the website data and the user interaction data; and
displaying, using the mobile web browser extension, the offer data with the website in the mobile web browser application.

10. A method comprising:
detecting, via a mobile web browser extension on a mobile device system of a user, that the user is requesting an opt-in permission for a use of the mobile web browser extension with a mobile web browser application on the mobile device system;
redirecting the mobile web browser application to a webpage associated with a first domain enabling the opt-in permission for the use of the mobile web browser extension with the mobile web browser application;
injecting an iframe into the webpage that enables the webpage to load a second domain associated with the mobile web browser extension, wherein the injecting comprises:
embedding hypertext markup language (HTML) code that directs the webpage to the second domain in the mobile web browser application on the webpage, wherein the iframe is loaded by the HTML code when directing to the second domain,
executing a call to the second domain for a permission grant level set by the user, and
executing a script from an application manifest of the mobile web browser extension for the opt-in permission within the iframe;
inferring the permission grant level for the use of the mobile web browser application based on the executed script and the call to the second domain for the permission grant level; and
setting the opt-in permission for the use of the mobile web browser extension with the mobile web browser application based on the permission grant level.

11. The method of claim 10, wherein the mobile device system executes an iOS operating system and wherein the mobile web browser application comprises a mobile Internet iOS application.

12. The method of claim 10, wherein prior to detecting that the user is requesting the opt-in permission, the method further comprises:
executing the mobile web browser extension responsive to a selection of a mobile application icon on the mobile device system; and
prompting, via an interface provided by the mobile web browser extension, the user to request the opt-in permission for the use of the mobile web browser extension.

13. The method of claim 12, wherein prior to the prompting, the method further comprise:
establishing an account for the user for the mobile web browser extension with a service provider associated with the mobile web browser extension,
wherein the prompting is further in response the establishing.

14. The method of claim 13, wherein the account is established using a username, a password, and a payment instrument provided by the user.

15. The method of claim 10, wherein the webpage comprises a webpage interface that enables the user to select the opt-in permission for a service provider associated with the mobile web browser extension, and wherein the iframe enables an additional webpage for the domain associated with the service provider to be loaded that enables an execution of the script.

16. The method of claim 10, wherein the application manifest for the mobile web browser extension comprises a file stored locally in a database of the mobile device system.

17. The method of claim 10, wherein the mobile web browser extension is provided in a separate mobile application that runs with at least the mobile web browser application on the mobile device system.

18. The method of claim 10, wherein the opt-in permission comprises at least one of a length of time for the use of the mobile web browser extension with the mobile web browser application or a selection of one or more websites for the use of the mobile web browser extension with the mobile web browser application.

19. A non-transitory machine-readable medium having stored thereon machine-readable instructions executable to cause a machine to perform operations comprising:
detecting, via a mobile web browser extension on a mobile device system of a user, that the user is requesting an opt-in permission for a use of the mobile web browser extension with a mobile web browser application on the mobile device system;
redirecting the mobile web browser application to a webpage associated with a first domain enabling the opt-in permission for the use of the mobile web browser extension with the mobile web browser application;
injecting an iframe into the webpage that enables the webpage to load a second domain associated with the mobile web browser extension, wherein the injecting comprises:
embedding hypertext markup language (HTML) code that directs the webpage to the second domain in the mobile web browser application on the webpage, wherein the iframe is loaded by the HTML code when directing to the second domain,
executing a call to the second domain for a permission grant level set by the user, and
executing a script from an application manifest of the mobile web browser extension for the opt-in permission within the iframe;

inferring the permission grant level for the use of the mobile web browser application based on the executed script and the call to the second domain for the permission grant level; and setting the opt-in permission for the use of the mobile web browser extension with the mobile web browser application based on the permission grant level.

20. The non-transitory machine-readable medium of claim 19, wherein the injecting the iframe comprises loading the domain via the iframe and inferring that the user has granted access by the mobile web browser application to a plurality of websites accessible using the mobile web browser application.

* * * * *